United States Patent

Patchett et al.

[11] Patent Number: 5,820,693
[45] Date of Patent: Oct. 13, 1998

[54] PROCESS FOR RECOVERING CATALYSTS SUPPORTS

[76] Inventors: Joseph A. Patchett, 137 Alexandria Way, Basking Ridge, N.J. 07920; Barry K. Speronello, 15 Carriage Trail, Belle Meade, N.J. 08502; John M. Nugent, 114 Willow Creek Cir., Seneca, S.C. 29678

[21] Appl. No.: 725,264

[22] Filed: Oct. 2, 1996

Related U.S. Application Data

[63] Continuation of Ser. No. 187,930, Jan. 27, 1994, abandoned.

[51] Int. Cl.$^6$ .............................. B08B 9/00; B08B 3/02; B08B 5/00
[52] U.S. Cl. .................................. 134/22.12; 134/22.18; 134/36; 134/37
[58] Field of Search .............................. 134/22.1, 22.12, 134/22.18, 22.15, 22.13, 22.99, 26, 30, 31, 34, 37, 38

[56] References Cited

U.S. PATENT DOCUMENTS

| | | | |
|---|---|---|---|
| 3,565,830 | 2/1971 | Keith et al. | 252/466 |
| 3,790,654 | 2/1974 | Bagley et al. | 264/177 |
| 3,864,451 | 2/1975 | Lee et al. | 423/239.1 |
| 3,885,977 | 5/1975 | Lachman | 106/62 |
| 3,889,464 | 6/1975 | Gardner | 60/286 |
| 3,905,743 | 9/1975 | Bagley et al. | 425/464 |
| 3,950,175 | 4/1976 | Lachman et al. | 106/40 R |
| 4,033,785 | 7/1977 | Gibbs | 134/37 |
| 4,071,639 | 1/1978 | Palmer et al. | 427/156 |
| 4,076,792 | 2/1978 | Foster et al. | 423/213.5 |
| 4,115,110 | 9/1978 | Pyrth et al. | 75/430 |
| 4,145,397 | 3/1979 | Toida et al. | 423/54 |
| 4,167,721 | 9/1979 | Senor et al. | 337/112 |
| 4,171,287 | 10/1979 | Keith | 502/304 |
| 4,206,087 | 6/1980 | Keith et al. | 502/304 |
| 4,295,892 | 10/1981 | Matsuhisa et al. | 501/120 |
| 4,335,023 | 6/1982 | Dettling et al. | 502/262 |
| 4,589,234 | 5/1986 | Rebhan et al. | 51/417 |
| 4,708,452 | 11/1987 | Schoen | 354/317 |
| 4,727,052 | 2/1988 | Wan | 502/327 |

(List continued on next page.)

FOREIGN PATENT DOCUMENTS

| | | | |
|---|---|---|---|
| 0041310 | 12/1981 | European Pat. Off. | H03G 7/00 |
| 0 241 310 | 10/1987 | European Pat. Off. . | |
| 0436421 | 7/1991 | European Pat. Off. . | |
| 52-148466 | 12/1977 | Japan | B01D 53/34 |
| 79-165092 | 12/1979 | Japan | C01G 41/00 |
| 80-154581 | 11/1980 | Japan | B01J 37/08 |
| 81-63379 | 4/1981 | Japan | B01J 23/92 |
| 81-98361 | 6/1981 | Japan | B01J 23/92 |
| 82-72851 | 4/1982 | Japan | B01J 37/06 |
| 85-99536 | 5/1985 | Japan . | |
| 85-199347 | 9/1985 | Japan . | |
| 86-146836 | 6/1986 | Japan . | |
| 61-227846 | 10/1986 | Japan . | |
| 88-250505 | 10/1988 | Japan . | |
| 2-26644 | 1/1990 | Japan . | |
| 84-113250 | 1/1986 | Romania . | |
| 88425 B1 | 1/1986 | Romania | C01G 31/02 |

*Primary Examiner*—Jill Warden
*Assistant Examiner*—Saeed Chaudhry

[57] ABSTRACT

The present invention relates to a method of removing a coating, such as a spent catalyst coating, from a carrier such as a metal plate or a honeycomb carrier. The metal plates have a surface which has the catalyst coating. The honeycomb is of the type having a plurality of channels defined by honeycomb walls, the honeycomb walls the having a coating thereon. The method comprises directing a fluid stream which can comprise a cleaning liquid at the coated plate surface or into the honeycomb channels with sufficient force to loosen and remove at least some of the coating from the carrier surface. The carrier can then be separated from the liquid and dried. Where additional coating is to be removed, a stream of gas is directed at the carrier surface with sufficient force to loosen and remove at least some of the coating. The cleaned carrier can then be recoated. The present invention includes reclaimed and recoated articles.

18 Claims, 6 Drawing Sheets

U.S. PATENT DOCUMENTS

| | | | |
|---|---|---|---|
| 4,741,082 | 5/1988 | Kannianen | 29/157 R |
| 4,806,517 | 2/1989 | Vanderpool | 502/208 |
| 4,836,858 | 6/1989 | Reinhart | 131/1 |
| 4,857,413 | 8/1989 | Hashimoto et al. | 428/592 |
| 4,902,664 | 2/1990 | Wan | 502/300 |
| 4,969,265 | 11/1990 | Ehara | 29/890 |
| 5,000,206 | 3/1991 | Kramer et al. | 134/34 |
| 5,010,051 | 4/1991 | Rudy | 502/304 |
| 5,024,981 | 6/1991 | Speronello | 502/67 |
| 5,045,352 | 9/1991 | Mueller | 134/22.12 |
| 5,053,285 | 10/1991 | Gojny et al. | 428/593 |
| 5,057,483 | 10/1991 | Wan | 502/304 |
| 5,091,001 | 2/1992 | Schumacher | 75/586 |
| 5,120,690 | 6/1992 | Jung et al. | 501/155 |
| 5,127,690 | 7/1992 | Dittrich et al. | 134/21 |
| 5,128,306 | 7/1992 | Dettling et al. | 502/304 |
| 5,130,109 | 7/1992 | Wan | 423/213.2 |
| 5,139,992 | 8/1992 | Tauster et al. | 502/304 |
| 5,167,721 | 12/1992 | Mccmas et al. | 134/32 |
| 5,212,142 | 5/1993 | Dettling | 502/304 |
| 5,232,882 | 8/1993 | Yoshimoto et al. | 502/5 |

PROCESS FOR RECOVERING CATALYSTS SUPPORTS

This is a continuation of application Ser. No. 08/187,930, filed Jan. 27, 1994 now abandoned.

FIELD OF THE INVENTION

The present invention is in the field of methods and apparatus for removal of coatings from articles; and more particularly, the invention relates to decoating of coated catalyst carriers.

DESCRIPTION OF THE RELATED ART

Certain articles of manufacture have coatings which, from time to time, must be removed so that the spent coating and/or the supporting structure may be recovered and recycled. Recovery of spent catalyst compositions from catalyst coated carriers is desired because such compositions often contain valuable compounds, including precious metals. Generally, these coatings have been recovered with little regard for the catalyst carrier. The value of the recovered spent coating compositions has been considered to be much greater than that of the carrier. U.S. Pat. No. 5,091,001 discloses the recovery of spent vanadium pentoxide catalyst by vitrification. U.S. Pat. No. 5,120,690 discloses a process for the utilization of used DeNox catalysts.

U.S. Pat. No. 5,127,960 discloses an apparatus for the recovery of catalyst washcoat composition remaining in the channels of freshly coated monolithic or honeycomb catalytic carriers. The catalyst carrier is inserted into a chamber from above and tightly fitted therein, at least with the lowest part of the carrier therein. The chamber is fitted with a collection area and run off located thereunder. Air is aspirated through the carrier channels, which are opened at the top or gradually opened by means of a slotted slide. This action causes the washcoat remnants to be transferred into a separation vessel where they can be collected in a sump and pumped away for reuse.

Many publications recite methods for regeneration of spent denitration catalysts. The catalyst which may be supported on a carrier is leached to remove alkyl salt deposits and then reused. Such disclosures are presented, for example, in Japanese publication JP 85-1993 47, Sep. 11, 1985, as well as Japanese publication 85-9953 6, May 13, 1985. 84 RO-113250 discloses a process for recovery of vanadia and silicon dioxide from spent catalysts. The process consists of nitric acid treatment with reflux boiling to yield a insoluble residue which is boiled under pressure with an ammonia solution to subtract vanadia. The non-dissolved product is boiled with sodium hydroxide and the resulting solution heated and brought to a pH of 8 to 8.5 using nitric acid. It is used in the treatment of vanadium pentoxide based catalyst with a ceramic carrier.

J52148466-A, Dec. 9, 1977 discloses a catalyst composed of activated carbon impregnated with ammonium bromide and/or ammonium iodide and made inactive by deposition of ammonium sulfate when used for removal of oxide of sulfur and nitrogen waste gases. The catalyst is regenerated when washed with water to remove the ammonium sulfate by dissolution.

Metal and Inorganic Waste Reclaiming Encyclopedia, beginning at page 546 reviews the recovery of vanadium of spent catalyst. U.S. Pat. No. 4,145,397 discloses the removal of cobalt from spent catalyst.

Japanese reference JP 88-250505, Oct. 4, 1988 is directed to an apparatus for regeneration of spent catalyst from flue gas denitration. The term catalyst as used in this reference apparently means supported catalyst composition or the catalyst in self supporting form. Spent catalyst from the denitration of coal-fired boiler flue gases is regenerated by polishing the catalyst surface in an apparatus comprising means for passing the catalyst through a polishing chamber with belt conveyers, means for blowing air through greater than one nozzle to remove dust from the polished surface, and means for discharging the collected dust from the chamber bottom. The catalyst comprises $TiO_2$-based honeycombed structure.

Japanese publication 86-146836 published Jun. 25, 1986 is directed toward a method for regeneration of catalyst used in flue gas treatment. There is disclosed a porous ceramic carrier containing spent catalyst, which is heated with oxygen rich gas to burn unburned carbon particles deposited thereon and to increase the air passage.

European Patent EP 41310 A2 published as EP 87-303168 Apr. 10, 1987 is directed to a method for the dry regeneration of catalyst. In particular, the dry regeneration of a deteriorated catalyst formed in the shape of a large number of tubes, or honeycomb, or a large number of plates. An abrasive material is used to grind the surface of the interiors of the many holes in the deteriorated catalyst. Additionally, $SiO_2$ sand is used as an abrasive material. The abrasive material is caused to flow through the interiors of the catalyst hole on an air current and by its own weight and vibration.

RO 88425 B1 dated Jan. 30, 1986 discloses a process for the recovery of vanadium and silica from spent catalysts. The vanadia and silica are on a ceramic carrier. The vanadia was recovered using nitric acid and the silica was recovered by leaching the ceramic catalyst with sodium hydroxide.

Japanese reference JP 82-72851, Apr. 30, 1982 discloses that a spent honeycomb (supported) catalyst containing titanium dioxide was soaked in nitric acid for regeneration. The denitration efficiency of the regenerated catalyst in an air stream containing ammonia and nitrogen oxides was similar to a fresh one.

Japanese reference JP 81-98361 dated Jun. 26, 1981 discloses that spent denitration catalyst containing vanadium dioxide and titanium oxide was washed with water or an aqueous inorganic acid, soaked in aqueous tungstate and calcined for regeneration.

Japanese reference JP 80-154581 dated Nov. 5, 1980 discloses a honeycomb with 5 mm squared holes and 0.8 mm thick walls loaded with titanium dioxide, vanadium dioxide and tungsten trioxide for use to treat boiler flue gas containing nitrogen oxides and sulfur oxides in the presence soot and ammonia. The spent (support) catalyst, clogged by soot was regenerated by washing, drying and heating and then loaded again. Similarly, Japanese reference 79-165092 dated Dec. 19, 1979 discloses that spent denitration catalyst containing titania, vanadia, and tungsten trioxide and leached with aqueous $H_2C_2O_4$ and/or $H_2SO_4$ to remove vanadia and then with sodium hydroxide to remove tungsten. The catalyst (carrier) is disposed of or loaded again.

Japanese reference 81-63379 dated Apr. 28, 1981 discloses the regeneration of spent titanium dioxide, vanadium pentoxide exhaust gas denitration catalyst. Honeycomb (supported) catalyst coated with such materials is disclosed to be used for boiler waste gas containing nitrogen oxide ammonia and sulfur oxides. The spent catalyst was washed with water at 70° C. by circulation for 0.5 hours, soaked in an aqueous solution of titanium dioxide and $NH_4VO_3$, mixed with aqueous $MeNH_2$ to give a 0.5 P viscosity, dried and calcined and used again.

Apparatus for decoating articles of manufacture are known generally and disclosed, for example, in U.S. Pat. Nos. 4,708,452; 4,589,234; 4,071,639; 4,167,721; 4,836,858. Additionally, patents such as U.S. Pat. No. 3,889,464 disclosed that catalytic converters may be reprocessed and reused.

SUMMARY OF THE INVENTION

The present invention is directed to a method to remove a coating from coated articles including articles in the form of plates and articles comprising a plurality of passages, also referred to as channels, through the article. The present invention is particularly useful in a method of removing a coating, including a catalyst coating, from monolithic honeycomb carriers of the type having a plurality of channels defined by the honeycomb walls. The coating is removed from the channel walls and the monolith carrier can be reused. The invention is also applicable to cleaning catalyst coated onto metal plates. The plates may be cleaned individually or, alternatively, the plates can be cleaned while assembled as a monolith. If the cleaning is done to the plates individually, physical abrasion may be used to help remove the catalyst.

The present invention includes a method of removing a coating from a coated article having a coated surface. The method comprises directing a fluid stream, preferably comprising at least one cleaning liquid, preferably water, at the coated surface with sufficient force to loosen and remove at least some of the coating from the walls. The fluid stream can be directed at the article in a gas, such as air. Preferred fluids include water, organic solvents and steam. Alternatively, the coated article can be immersed in an immersion liquid prior to directing the fluid stream at the surface of the immersed article. The article is separated from the fluid and then dried in a gas, preferably air. Preferably, a stream of gas is then directed at the coated surface of the article with sufficient force to loosen and remove at least some of the coating remaining on the walls after being bypassed to the fluid stream.

The method can be used where the coated article is a metal plate having a coated plate surface. The fluid stream and subsequent gas stream are directed along or at an angle to the surface of the metal plate. The method is particularly useful to remove coatings from spent catalyst coated metal plates.

The method is particularly useful to remove coatings from honeycomb monoliths used as a carriers for catalyst coating compositions. After the coated honeycomb catalyst is used, a residual coating comprising the catalyst composition remains on the channel walls. The remaining catalyst composition can comprise precious metal and base metal compounds as well as high surface area catalyst support compounds. It is desirable to recover certain catalyst composition components including precious metals and/or base metal compounds. Ceramic honeycombs can also be a valuable article which can be recovered and reused. Used honeycomb walls are typically coated with residual adherent catalyst composition as well as debris deposited from the fluids, typically exhaust or vent gases, which pass through the honeycomb during use. Both the residual catalyst and debris can be removed using the present method.

A specific and preferred embodiment of the present invention for removing a catalyst coating from a coated article selected from plates or honeycomb monoliths having a catalyst coating comprises directing a fluid stream of at least one cleaning liquid or a combination of cleaning fluids, such as a liquid and a gas, i.e., water and air, at the coated plate surface or into the channels of a monolith with sufficient force to loosen and remove at least some of the coating from the walls. The fluid stream can be directed at the plate surface or into the honeycomb channels while the plate or honeycomb is either in air or immersed in an immersion liquid. The coated article is then separated from the liquid, particularly if it had been immersed in an immersion liquid. This can be accomplished by draining the liquid from the honeycomb channels and drying the honeycomb. The immersion liquid is preferably the same liquid as the liquid used in the cleaning fluid stream. The first step of using a fluid stream removes at least some of the catalyst coating and may be sufficient to provide a surface which can be recoated. If this step is sufficient, the metal plates or monolith can be dried and coated with a catalyst composition. The fluid stream can be supplied by the use of one or more fluid nozzles.

In a preferred method, and particularly where the steps of directing the fluid stream does not remove all of the catalyst coating, the metal plate or honeycomb monolith can be dried in a gas, preferably air after being cleaned with the liquid streams. A stream of gas is then directed at the plate surface or into the channels of the monolith with sufficient force to loosen and remove at least some of the coating from the walls. The use of separate steps of using a first stream of liquid followed by a second stream of gas has been found to effectively loosen and remove coatings from the surface of the honeycomb monolith narrow channels while avoiding clogging during the cleaning process. The stream of gas can be supplied by use of one or more gas nozzles with a useful nozzle including an elongated nozzle, also referred to as an air knife.

The fluid stream, preferably a liquid, more preferably water, can be directed into the honeycomb monolith channels at a flow rate of 0.5 to 5 gallons per minute for each fluid nozzle with a pressure of 10 to 150 psi and preferably 50 to 150 psi. Ceramic honeycombs are preferably cleaned with liquid at flow rates of from 0.5 to 5, preferably 1.0 to 3.0 gallons/minute, and a pressure of 50 to 150 psi and preferably 50 to 125 psi and more preferably 75 to 120 psi for each fluid nozzle. Ceramic honeycombs are preferably cleaned with the subsequent stream of gas at a pressure of 50 150 psi, preferably 50 to 150 psi, and more preferably 50 to 120 psi and most preferably 75 to 110 psi; and at a flow rate of 10 to 120 standard cu/ft per minute for each gas nozzle. The fluid stream and gas stream pressures and/or flow rate can be controlled to substantially minimize wearing, chipping, or cracking of ceramic honeycombs during the cleaning. Metal honeycombs and plates can be cleaned with the liquid stream at pressures up to 10,000 psi or more, and preferably 500 to 10,000 psi. Typically, the same flow rates can be used as are used with ceramic honeycombs.

Coated ceramic honeycombs are typically porous in nature and contain catalyst compositions on the surface, as well as within the pores of the honeycomb structure. A useful embodiment of the present invention includes a reclaimed ceramic honeycomb having wall surfaces and which had been coated with a catalyst composition. At least some of the pores of the cleaned honeycomb may contain a residual catalyst composition while the wall surface has substantially no residual catalyst. This reclaimed honeycomb can then be coated with same or different catalyst composition. Preferably, catalyst compositions similar to the residual composition in the pores are coated onto reclaimed honeycombs to assure satisfactory adhesion, as well as compatibility with the residual catalyst composition in the pores.

The method of the present invention results in a reclamation of coating materials which can contain valuable catalytic components. Additionally, the monolithic articles, including honeycombs and metal plates assembled to form monoliths having a series of channels can be reused with substantially the same effectiveness as a new article.

BRIEF DESCRIPTION OF THE FIGURES

FIG. 6' is an end view of an alternate embodiment of a catalyst structure made of a metal plate.

DESCRIPTION OF THE PREFERRED EMBODIMENTS

The preferred embodiments of the present invention will be understood by those skilled in the art by reference to FIGS. 1–7.

The present invention is directed to a method of removing the coatings from the surfaces of coated articles including plates, and articles having channels, including a monolith articles such as a monolith honeycomb. Monolith carriers can have a plurality of passages through a single piece carrier, or comprise of a plurality of metal plates defining a plurality of channels or passageways. The passages are open to fluid flow and thus are not blocked or sealed against flow from an inlet to a separate outlet, and accordingly, the passages are not merely surface pores. Where the monolith is made of a porous material, the passages are generally rather large compared with the size of surface pores. The monolith carriers have a unitary, skeletal structure of macrosize. The flow passages of the monolith carrier may be thin-walled channels providing a relatively large amount of open frontal surface area. The channels can be one or more of a variety of cross-sectional shapes and sizes. The channels can be of the cross-sectional shape of, for example, a triangle, trapezoid, rectangle, polygon of more than four sides (i.e. hexagonal), square, sinusoid, oval or circle, so that cross-sections of the carrier represent a repeating pattern that can be described as a honeycomb, corrugated or lattice structure. The walls of the cellular channels are generally of a thickness necessary to provide a sufficiently strong unitary body, and the thickness will often fall in the range of about 2 to 50 mils. With this wall thickness, the structures may contain from about 8 to 2500 or more inlet openings for flow channels per square inch of cross-section and preferably 10 to 600 and more preferably from 50 to 400 gas inlets and flow channels per square inch. The open frontal area of the cross-section may be in excess of about 60% and typically from 60 to 85% of the total frontal area. The article surfaces, including plate surfaces and monolith channel wall surfaces, can be coated with various compositions, including catalyst compositions. The present invention includes a method of removing a coating of used catalyst composition and/or other debris from the surfaces of the channels of a honeycomb carrier.

Useful and preferred monoliths are described in U.S. Pat. No. 4,206,087, hereby incorporated by reference. The monolith catalytic carrier component is relatively catalytically inert compared with the high surface area catalyst support compounds of the catalyst composition. The carrier is generally of considerably lower total surface are than the catalyst support which is applied thereto. Thus, the monolith carrier may have a total surface area of less than about 5 or 10 square meters per gram, more often less than about 1 square meter per gram, as determined by the BET method. The carrier may be in macrosize particle form before the more catalytically-active materials are added, and preferably the carrier is in monolith form, e.g., a honeycomb configuration.

The method of the present invention can be used with honeycombs which are made with ceramic compositions, honeycombs derive from ceramic paper, as well as metal honeycombs. The method can be additionally used regardless of how the honeycomb is formed. It can be used with ceramic honeycombs which are extruded, formed by calendaring or assembled from ceramic paper or monoliths made from metal layers or plates. The honeycomb can be assembled from corrugated layers of ceramic paper or metal. Useful corrugated honeycombs can have alternate corrugated (i.e., sinusoidal) and flat layers.

Useful metal monoliths with a corrugated configuration which can be used as monolith supports are described in references such as U.S. Pat. No. 4,741,082 as well as U.S. Pat. Nos. 4,969,265; 4,857,413; 5,053,285 and the like, all herein incorporated by reference.

Monolith carriers which can be the subject of the method of this invention may be made of one or more of a variety of materials, but typically are composed primarily of one or more refractory oxides, other ceramics, metals or ceramic coated metal plates. Useful monolith honeycomb carriers are comprised of cordierite, cordierite-alpha alumina, silicon nitride, zircon mullite, spodumene, alumina-silica-magnesia or zirconium silicate. Examples of other refractory ceramic materials utilizable in place of the preferred materials as a carrier are sillimanite, magnesium silicates, zircon petalite, alpha-alumina and aluminosilicates. Such carriers are described, for example, in U.S. Pat. No. 3,565,830; herein incorporated by reference. Useful honeycomb monolith and related methods are also disclosed in U.S. Pat. Nos. 3,790,654; 3,885,977; 3,905,743; 3,950,175; 4,076,792, 4,295,892 and 4,335,023, all herein incorporated by reference.

A preferred monolith carrier contemplated for decoating in accordance with the present method is a honeycomb of the type having a plurality of parallel gas flow passages extending therethrough from an inlet to an outlet phase of the carrier, so that the passages are open to fluid flow therethrough. The passages which are substantially straight from their fluid inlet to their fluid outlet, are defined by walls on which a catalytic composition is coated as a "washcoat" so that the gases flowing through the passages contact the catalytic material.

The honeycomb monoliths, and monoliths made of assembled corrugated metal plates, can be coated with catalysts useful for removal of pollutants from gas streams. Spent catalyst coated honeycombs can have residual useful compounds which can be recycled for use. The origin of the spent catalyst may be from automotive, as well as industrial waste gas stream treatment systems. The method of the present invention can be used to remove coatings. Coatings can include debris from the waste streams left on honeycombs. However, the present method is useful for the treatment of honeycombs of the type which have been coated with automotive coatings of the type described in U.S. Pat. Nos. 5,212,142; 5,139,992; 5,130,109; 5,128,306; 5,057,483; 5,010,051; 4,902,664; 4,806,517 and the like all herein incorporated by reference. The method of the present invention is also useful for cleaning monoliths, preferably ceramic honeycombs coated with compositions used for treating stationery source industrial waste gases and power plant waste gases such as nitrogen oxides. Catalyst compositions useful for the selective catalytic reduction of nitrogen oxides are useful. Typical of such processes are those described in U.S. Pat. Nos. 5,024,981 and 3,864,451; and the like. Methods to prepare catalysts and coat ceramic honeycomb are discussed in the above references, as well as in U.S. Pat. Nos. 4,171,287 and 4,727,052. The above references are all hereby incorporated by reference to illustrate typical catalyst compositions used to coat monolith carriers and methods to prepare such compositions and method to coat the carriers.

As recited in the above references, catalyst compositions can contain a variety of metals and method compounds which can include platinum group metal compounds based on metals such as platinum, palladium, rhodium, ruthenium and iridium; and base metal oxides such as $V_2O_5$, $TiO_2$, $Al_2O_3$ and $SiO_2$. Also included are components such as zeolites and related structures. Additionally, the compositions can include a variety of rare earth metal compounds based on rare earth metals such as cerium, lanthanum, neodymium and praseodymium. Recovery of these metal compounds is desirable as recited in the background. Additionally, it is desirable to recover the monolith support such as the honeycomb supports described above. In particular, it is desirable to recover large honeycomb supports used as a catalyst support for the treatment of industrial waste gases.

A plurality of catalyzed monolith carriers can be combined as a module in a common housing or frame so that the inlets open to the inlet side of the module and their outlets open to the outlet side of the module. Alternatively, a plurality of metal plates can be contained in a suitable housing. In this way, a plurality of small monolith elements or plates can be combined to form a large frontal area to receive large quantities of waste gases which are generated in industrial applications and power plants. Alternatively, the catalyzed monoliths or metal plates can be incorporated into existing structures such as rotating air preheaters.

In accordance with the method of the present invention, a metal plate or monolith article, preferably a honeycomb, which can be a ceramic or metallic honeycomb, is cleaned of substantially all residual surface coating (i.e., catalyst coating) and debris. In a preferred method to clean the surface of a monolith honeycomb having a plurality of parallel channels, a stream of cleaning fluid is directed into the channels with sufficient force to remove at least some of the coating from the walls. The fluid comprises at least one liquid or steam. The honeycomb can be immersed in an immersion liquid or in the air in an ambient environment while a stream of cleaning fluid is directed to the coated surface. When immersed in an immersion liquid, the liquid can be at ambient temperature or at a lower or elevated temperature, depending on the coating to be removed. Preferred liquids in which the honeycomb can be immersed and which the cleaning liquid can comprise include water and organic solvents. The cleaning liquid can include a variety of additives including but not limited to bases and acids.

The honeycomb element is secured in place by suitable means such as clamps, during the cleaning process. Other means to secure the honeycomb elements in place include securing the honeycomb in a suitable cleaning frame or housing. Such a housing holds the honeycombs in place without damage while maintaining the front face of honeycombs at a constant distance from the cleaning nozzle. Where a plurality of honeycombs are present in a honeycomb module, the honeycombs can be cleaned while secured in the module. The module is held in place and a stream of cleaning liquid is directed into the channels of the plurality of honeycombs in the module. In this way the plurality of honeycombs in the module can be reused without disassembling and subsequent reassembly of the module.

The fluid stream can be directed using a suitable fluid nozzle. A useful flow-through fluid nozzle has a nozzle diameter of from 0.025 to 0.1 inches and preferably 0.05 to 0.1 inches with a most preferred nozzle diameter being 0.078 inches. The fluid nozzle should be capable of having a fluid nozzle flow-through rate of liquid at about 0.5 to 5 and preferably 1 to 3 and most preferably 2 gallons per minute. The fluid pressure used is preferably from 50 to 150 and preferably 75 to 120 psi for ceramic honeycombs. Because of their more robust nature, the cleaning pressure and flow rates used for metal honeycombs or plates can be much higher than for ceramic articles; with pressures up to 10,000 psi, and preferably 500 to 10,000 psi. It is desirable to use as high a pressure as possible without damaging the honeycomb carrier. The flow rate and pressure of the liquid stream can be easily determined for particular honeycomb geometry and coating compositions.

In a preferred method, upon completion of the step directing the stream of liquid at the plate surface or into the channels of the honeycomb, the plate or honeycomb is then separated from the fluid, i.e., liquid. The liquid is permitted to drain away from the plate or honeycomb which can then be dried in a gas such as air at ambient or high temperatures. The drying does not necessarily have to be complete. However, it is preferably that most of the free surface liquid be removed.

Upon completion of drying, a stream of gas, preferably air is then directed at the plate surface or into the honeycomb channels with sufficient force to loosen and remove at least some of the residual coating from the walls. A useful air jet is supplied by a gas source through a gas nozzle or an open straight pipe having a suitable diameter. The diameter can be determined based on the desired flow rate and pressure. A useful diameter for the preferred pressure and flow rate ranges is from 0.05 to 1 inch and preferably 0.1 to 0.5 inches and most preferably 0.1 to 0.25 inches with a useful diameter of being at 0.18 inches. Preferably the gas is directed in the stream at a pressure of from 50 to 150, and more preferably 50 to 120 psi at a flow rate typically at from 10 to 100 standard cubic feet per minute per nozzle. Where the honeycomb is a ceramic honeycomb, it is preferred that the gas pressure be from 50 to 120 psi. The flow rate and pressure of the gas stream can be easily determined for particular honeycomb geometry and coating compositions. Alternatively, the gas nozzle can be in the form of an air knife. Higher pressures can be used for metal plates and monoliths than for ceramic monoliths.

The above-recited method results in reclaimed metal plates or honeycomb supports of the type recited above. At least 20, and typically from 20 to 90, and preferably 50 to 90, and ore typically from 50 to 80 weight percent of the coating and debris are removed. A specific and preferred reclaimed ceramic honeycomb has a plurality of channels defined by honeycombed walls having wall surfaces. The honeycomb walls comprise a ceramic composition having a porous structure comprising a plurality of pores. After the recited decoating method, at least some of the pores may contain residual catalyst and the wall surface as substantially no residual catalyst. The amount removed depends on the amount and type of debris, original catalyst coating, type of carrier and processing conditions. The decoated honeycomb can be reused. A subsequent or succeeding layer of catalyst can be coated onto the porous honeycomb containing the residual used catalyst. The coating has been found to have satisfactory adhesion and the reused honeycomb has performed satisfactorily.

Figure 1:
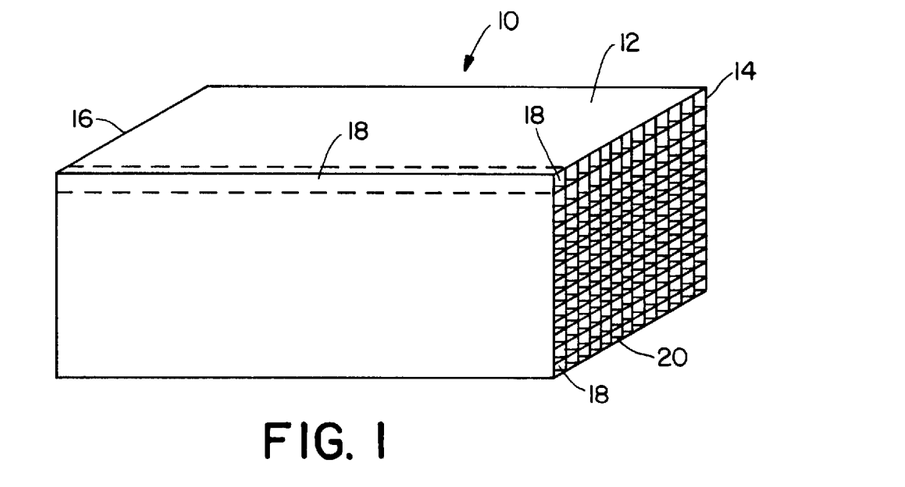
FIG. 1 is a view in perspective of a monolithic honeycomb, having a plurality of parallel channels.
Figure 2:
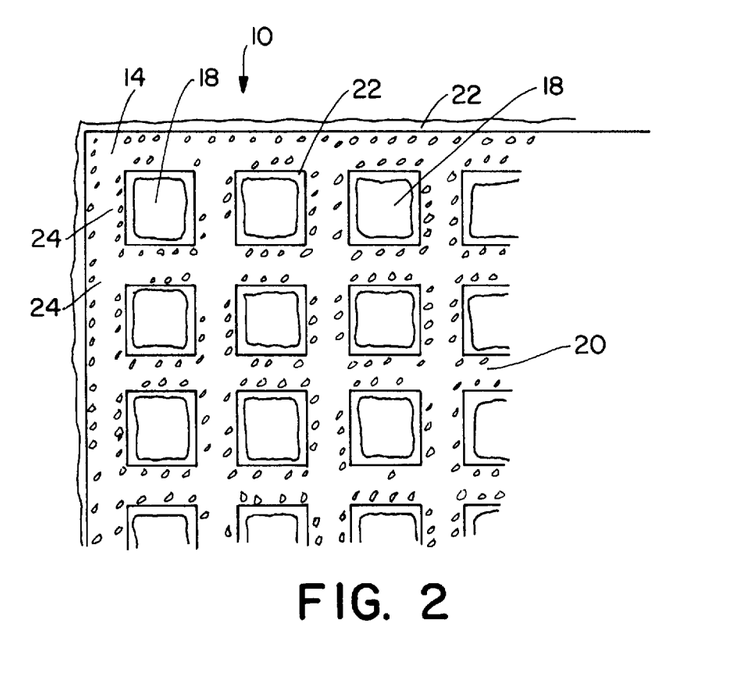
FIG. 2 is a partial side view of the honeycomb of FIG. 1.

Referring to FIG. 1, a preferred flow-through honeycomb 10 is shown in perspective. The honeycomb has an outer skin 12, an inlet side 14 and an outlet side 16. There are a plurality of channels 18 extending through the honeycomb from the inlet 14 to the outlet 16. The channels are defined by honeycomb walls 20 which run from the inlet to the outlet. The channels can have suitable shapes as recited above. In FIG. 1 the channels are shown to be parallel and have a square cross section. Preferably the channel walls are uniform in thickness between adjacent channels. FIG. 2 shows a partial frontal end view of honeycomb 10 looking toward inlet side 14. The honeycomb is shown to have been coated with a catalyst composition layer 22. The preferred honeycomb structure shown in FIGS. 1 and 2 comprises porous ceramic material. The pores are shown as reference character 24 around the skin 12 and the channels 18. Although the full cross section is porous, the illustrated pores contain at least some of the catalyst coating. When the catalyst composition layer 22 is cleaned according to the method of the present invention, a certain amount of catalyst composition can remain in the pores 24 near the channel surfaces and the skin surface.

Figure 3:
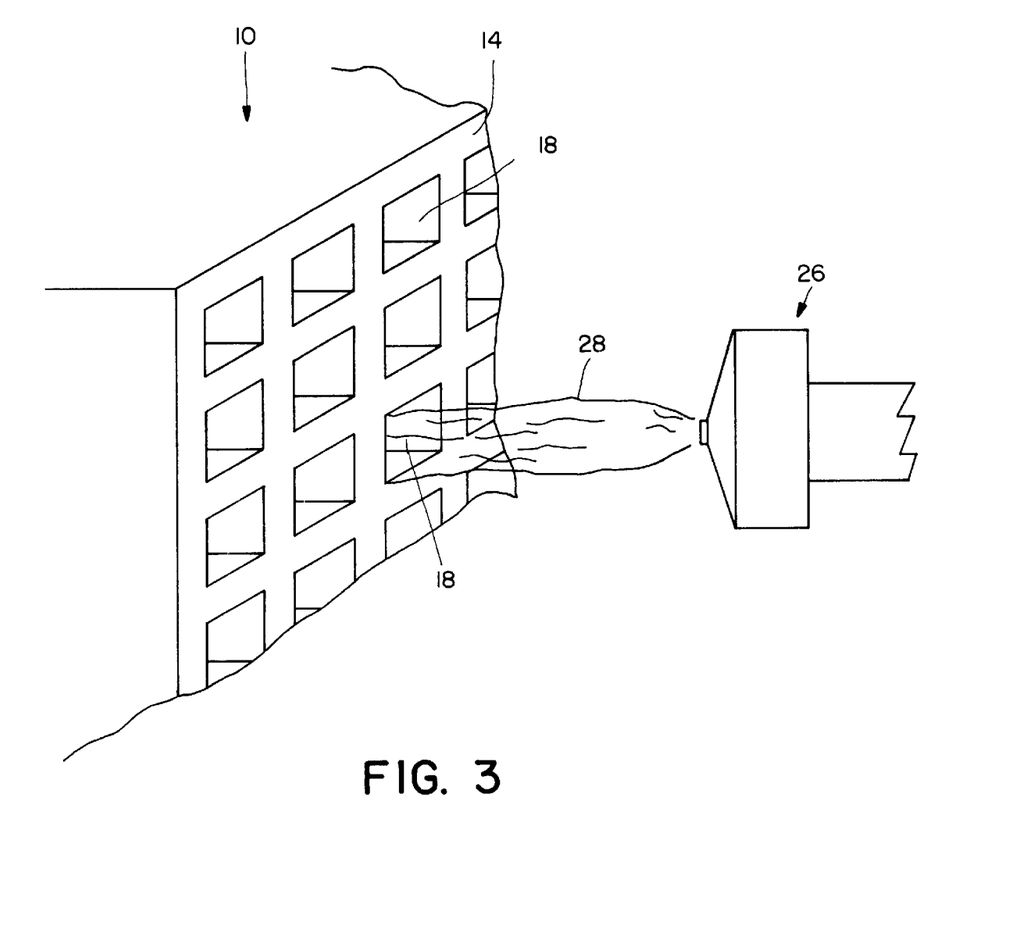
FIG. 3 is a partial view in perspective showing a liquid stream directed from a nozzle into the open end of a monolithic honeycomb.

FIG. 3 illustrates the method step of directing a stream of fluid, i.e. a liquid, into the channels 18 to remove at least some of the residual coating from the walls. Referring to FIG. 3, a fluid nozzle 26 which of the type recited above, is useful to direct a stream of liquid 28 into channels 18. One or more nozzles can be used to direct one or more streams of liquid 28 into channels 18. The nozzles can be moved along the inlet side or outlet side of the honeycomb. Preferably, the stream 28 is directed into the channels 18 parallel to the axis of the channels. Depending on the length of the channels, the nozzles can first be directed into the inlet side and subsequently into the outlet side. As recited above, the nozzle and the honeycomb can be immersed in an immersion liquid. In FIG. 3 the nozzle and the honeycomb are in ambient air and the liquid stream 28 is shown directed into the inlet side of channel 18.

Figure 4:
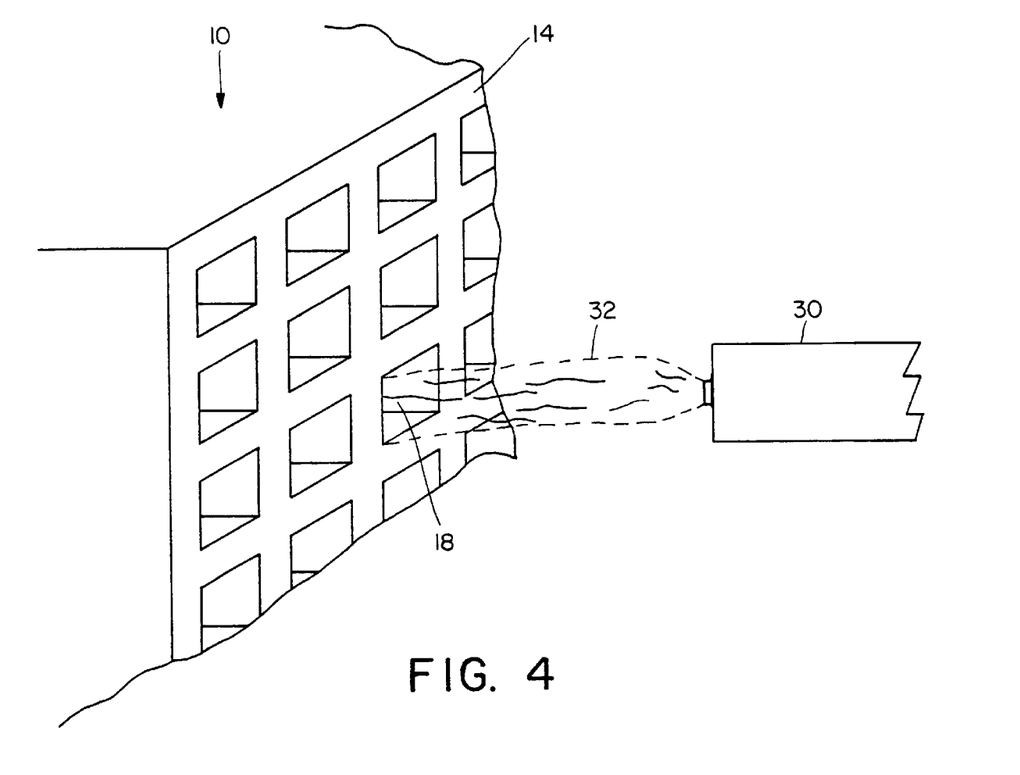
FIG. 4 is a partial view in perspective showing a gas stream directed from a nozzle into the open end of a monolithic honeycomb.

The coating removed by the nozzle is collected with the liquid from the liquid stream and the immersion liquid, where the honeycomb is cleaned in liquid. Residual catalyst composition can be collected for recycling at this point. The honeycomb can then be drained of free liquid and partially and preferably substantially dried. Subsequently, a stream of gas is directed into the channels with sufficient force to loosen and remove at least some of the remaining coating from the walls. In FIG. 4 a gas pipe or nozzle 30 is shown directing a gas stream 32 into the front inlet side 14 of channel 18. Depending on the frontal area of the honeycomb, there can be a plurality of gas nozzles 30 directing a plurality of streams 32 into channels 18. Preferably stream 32 is directed into the channel in a direction parallel to the channel axis.

The fluid and gas nozzles can be moved across the inlet face or the outlet face of the honeycomb to be directed into all of the channels. Alternately, the honeycomb can be moved relative to the nozzle to be sure that each of the channels receives a stream of liquid followed by gas for sufficient time to remove the residual coating. Typically, each channel receives a stream of liquid for from 0.01 to 1.0 seconds, preferably for 0.01 to 0.12 seconds and more preferably above 0.04 seconds; and a stream of gas for from 0.01 to 1 seconds, preferably from 0.01 to 0.12 seconds, and more preferably about 0.04 seconds. The cleaning time is dependent on the nozzle traverse rate, the possibility of nozzle overlap using multiple nozzles and size of the channels.

Figure 5:
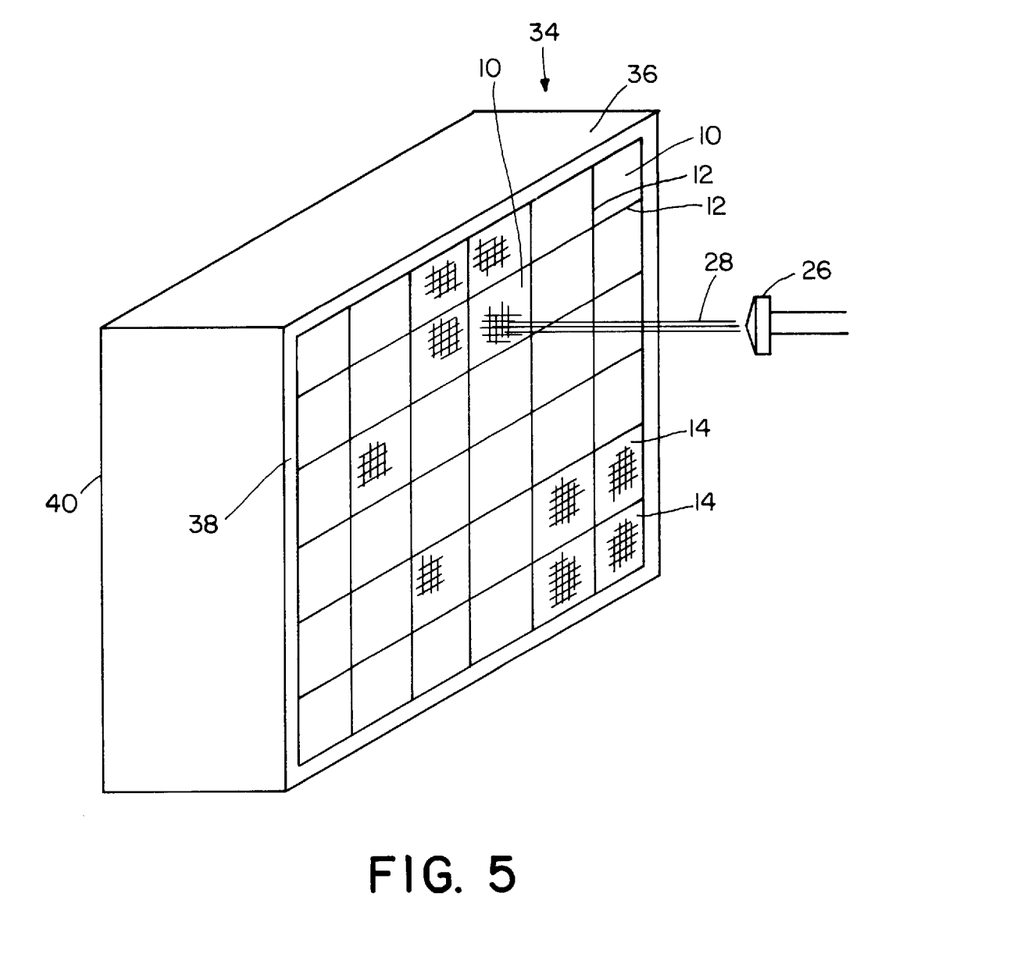
FIG. 5 is a perspective view of a plurality of honeycombs assembled in a module with a nozzle directing a stream of cleaning liquid into the opened channels.

Referring to FIG. 5, a plurality of honeycombs is shown assembled as a module 34. The module comprises a module housing 36. The honeycombs 10 are assembled and contained in housing 36 so that the outer skins 12 of adjacent honeycombs are adjacent to minimize leakage between waste gases between adjacent honeycombs during use.

The module has an inlet side 38 and an outlet side 40. The honeycombs 10 are assembled so that the honeycomb inlet sides 14 are aligned to open to the module inlet side, and the honeycomb outlet sides 16 open to the module outlet side 40. In FIG. 5 fluid nozzle 26 is shown directing a stream of fluid 28 into a honeycomb 10.

A typical commercial honeycomb is made of cordierite ceramic composition and has a nominal 4 to 8 by 6 to 8 inch rectangular (i.e. 6×6 inch square) cross section and can range from 4 to 20 inches long. These honeycombs are assembled into modules that can be from 2 to 4 feet square. A typical installation may contain 5000 cubic feet of catalyst. Cubic feet of catalyst refers to physical dimensions of the honeycombs. During use in an industrial or power plant environment, combustion exhaust is contaminated with materials such alkaline metal oxides, phosphates and heavy metals that poison the utility of the catalyst. The process of the present invention enables spent catalyst to be recovered, the poisons removed from the honeycomb and the ceramic honeycomb to be reused.

Figure 6:
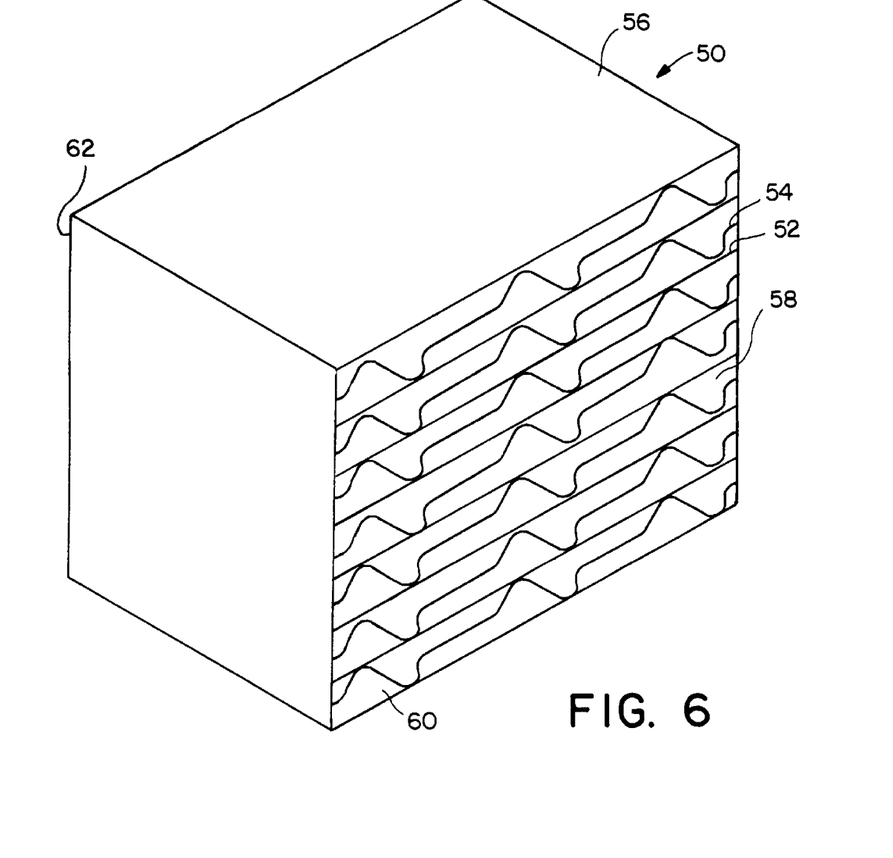
FIG. 6 is a partial perspective view of a catalyst structure made of flat and sinusoidal metal plate which can be cleaned according to the present method.

FIG. 6 illustrates a metal plate monolith 50 made of alternating flat metal plates 52 and corrugated metal plates 54. The monolith is assembled and contained within a suitable outer framework 56. Longitudinal channels 58 are defined by the layers of corrugated plate 54 and flat plate 52. The channels 58 extend from inlet side 60 to outlet side 62 and are opened at the inlet and outlet sides. The surfaces of the flat plate end or corrugated plates can be coated with one or more layers of the same or different catalytic compositions. The monolith 50 can be cleaned in assembled form in accordance with the method of the present invention. Alternatively, it can be unassembled and plates 52 and 54 can be separately cleaned.

FIG. 6' shows an alternate monolith construction containing multiple layers of metal plate bent into a tooth-like configuration. On assembling, a plurality of longitudinal channels are formed. Corresponding elements of FIGS. 6 and 6$^1$ have the same reference characters. The tooth-like plates are defined by reference character 64.

Figure 7:
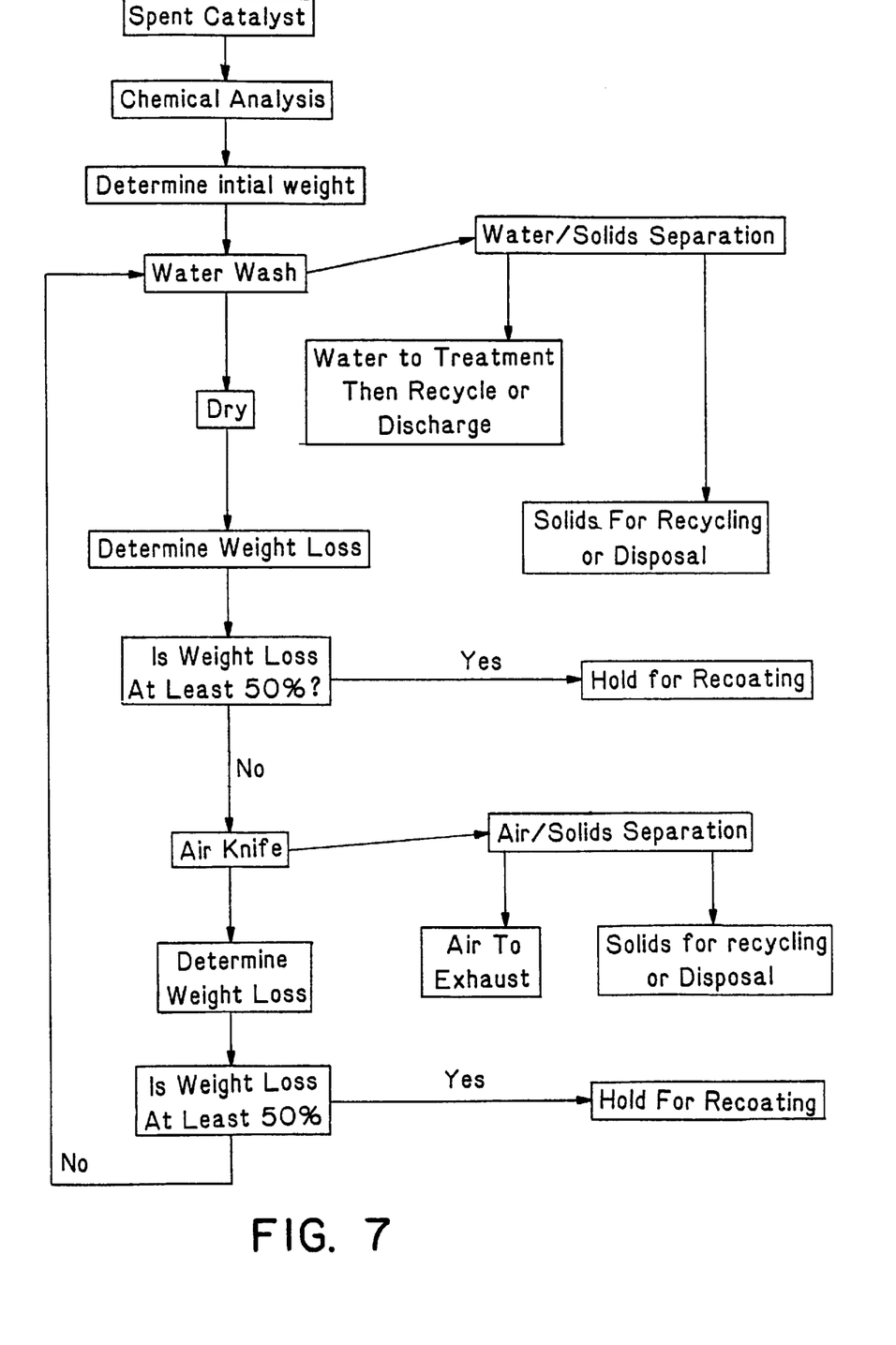
FIG. 7 is a flow chart of a preferred method of the present invention.

FIG. 7 illustrates a specific, useful and preferred flow chart for treatment of catalyst coated carriers (referred to in FIG. 7 as catalyst) that are used for the selective catalytic reduction of nitrogen oxides in waste gases. Initially, catalyst modules are returned for recycling from their place of use. Upon arrival the samples can be assessed for the level and nature of contaminants of the catalysts. The modules are weighed and then optionally immersed in water. Water is forced through the channels of the honeycomb by pressurized water jets. These pressurized water jets and the passage of water through the channels loosens some of the catalyst coating. The removed coating is collected, any required water treatment is done to remove harmful soluble materials [by settling and/or filtration] and cleaned water is either recycled or discharged. The module is then dried in air. The weight loss can be determined. If sufficient coating, i.e., 50%, is removed the catalyst substrate can be recoated. If sufficient coating is not removed, high-pressure air is passed through from an air knife through the honeycomb channels to remove remaining catalyst coating. The solids from the air knifing are separated from the air stream by any useful separating techniques. These collected solids are then disposed or kept for subsequent processing.

Upon completion of the air knifing, the module can be weighed and compared to its original weight to determine the extent of washcoat removal. The extent of washcoat removal has been found to be dependent upon the composition of the catalyst, the original loading and the geometry of the honeycomb. Longer honeycombs are more difficult to clean while honeycombs having fewer channels per square inch are easier to clean. Depending on the source of catalyst, removal rates between 20 and 90 weight percent of the coating and debris have been found. Preferably, as much removal as possible is attained without causing damage to the ceramic honeycomb. Removal ranges of from 50 to 90 weight percent of the coating and debris are preferred. In accordance with the method of the present invention, it has been found that where the honeycombs are in satisfactory condition, they can be reclaimed and recoated without disassembling the module. If an insufficient amount of coating is removed, the process can be repeated.

Washing followed by drying and air knifing is a significant aspect of the present process, especially for honeycombs with high catalyst loadings or catalyst coating that are very adherent. The removal of some washcoat during the water washing stage prevents blockage of the honeycomb channels during the air knifing process. Without removal of most of the loosely adherent coating during the water washing, the sudden removal of coating during air knifing can clog the channels of the honeycomb. Wetting then drying the washcoat appears to loosen the washcoat.

For SCR catalysts, such as those containing $TiO_2$, $V_2O_5$, and other transition metal oxides, the preferred washing conditions are water at neutral pH and room temperature or less. Under these conditions, the solubility of various of the catalyst compounds is low. For example, vanadium compounds have low solubility in water. If vanadium compounds are kept out of water solution, subsequent water treatment can be avoided or minimized with corresponding saving in costs, processing time and complexity.

The pressure and flow rate of water used to clean the channels should be sufficient to effect cleaning without damaging the honeycomb. While preferred pressure and flow rates are recited above, the correct combination of pressure and flow rate for a particular honeycomb is a function of both channel size and wall thickness of the honeycomb and the material of honeycomb construction. Assemblies made of metal plates can withstand higher pressures and flow rates then can ceramic materials. Similarly, the combinations of air pressure and flow rate are preferably as recited above. However, they should be determined for each specific honeycomb. Most preferably, the air pressures are between 40 and 80 psi.

The present invention is illustrated further by the following examples which are not intended to limit the scope of this invention.

EXAMPLES

Example 1

Honeycombs containing a vanadia-based catalyst composition commercial available for the selective catalytic reduction (SCR) of nitrogen oxides in waste gases from a natural gas burning power plant were cleaned and recoated according to the method of the present invention. The catalyst honeycombs were received and removed from their housing (cans) and subjected to the cleaning procedure shown in FIG. 7. The honeycombs were cordierite honeycombs about 5.9 inches×5.9 inches and ten inches long, with 100 channels/square inch. Table 1 below summarizes the initial weight and weight loss after water and air cleaning. During the cleaning, the honeycomb elements were clamped in place. A water stream from a 0.125 inch nozzle at 70 psi was directed into the channels. The honeycomb was then removed from the water and excess liquid drained. The honeycomb was dried in air at 120° C. The dry honeycomb was then air cleaned in a stream of air at 65 psi.

TABLE 1

| | Weight of honeycombs as received from the field and after cleaning | | |
|---|---|---|---|
| Block # | Initial Weight, g | Total weight loss After washing, g | Total weight loss After air knifing |
| 1 | 3495 | 173 | 487 |
| 2 | 3507 | 203 | 427 |
| 3 | 3531 | 157 | 400 |
| 4 | 3445 | 160 | 430 |
| 5 | 3518 | 158 | 385 |
| 6 | 3603 | 201 | 494 |
| 7 | 3502 | 84 | 377 |
| 8 | 3679 | 144 | 513 |

The extent of coating removal can be estimated from the original coating loading. The original coating loading was approximately 1.6 $g/in^3$ and the physical dimensions of the block were approximately 350 $in^3$. The loading per block was about 560 $g/in^3$. Based on this information, an excess of 80% of the coating was removed. It was found that between about 20 and about 50 weight percent of the coating was removed during the water washing step with the remainder removed during the air knifing step. The examination of the honeycombs after cleaning, using scanning electron microscopy showed almost complete coating removal. Some of the coating remained within the pores of the cordierite honeycomb.

Cylindrical cores about 6 inches long and parallel to the channels were cut from a cleaned. The cores were recoated at loadings from 1.0 to 1.3 $g/in^3$. Uncoated fresh honeycombs were also coated with the same catalyst composition. The coating loading on the recycled catalyst was about 66 to 75% of the original loading. The reduced loading on the recoated honeycombs allowed for preexisting washcoating in the pore of the honeycomb. The cores were tested "as coated" and after aging at 450° C. for 40 hours in 10% steam. The testing was done at 60,000 reciprocal hours space velocity, 200 ppm $NO_x$, 1:1 $NO_x$ to ammonia at 320°, 380° and 420° C. in 10% steam and 10% oxygen with the balance being nitrogen. Space velocity is defined as the volumetric flow of gases through the reactor over one hour at standard temperature and pressure divided by the volume of the reactor. The results of percent $NO_x$ converted are summarized in Table 2.

TABLE 2

Summary of performance Testing Comparing Fresh, Aged and Recycled Catalysts

| Sample | $NO_x$ Conversion (%) @ Temperatures | | |
|---|---|---|---|
| | 320° C. | 380° C. | 420° C. |
| recoat, 1.09 g/in³ | 80.4 | 86.9 | 86.9 |
| recoat, aged @450° C. for 40 hrs. | 77.4 | 85.1 | 85.6 |
| recoat, 1.3 g/in³ | 64.2 | 70.0 | 71.0 |
| fresh, 1.5 g/in³ | 67.7 | 73.1 | 72.5 |

The above results show that the recycled catalyst had equivalent performance to the samples prepared of the fresh honeycombs and that the aging the recoated honeycombs did not significantly alter their performance. The differences between the two sample groups reflects differences in coating, loading and coating formulation.

While the invention has been described in detail with respect to specific embodiments thereof, it will be appreciated that numerous variations to those embodiments will lie within the scope of the appended claims.

What is claimed is:

1. In a process for reclaiming a honeycomb carrier which has a plurality of channels having respective ends and being defined by honeycomb walls which have a tightly adherent wettable coating thereon, the walls being accessible to impingement of a fluid thereon only from the ends of the channels, a method for removing the coating from the honeycomb walls comprising the steps of:

directing a liquid which can wet the coating in a stream substantially parallel to the walls of the channels into the channels from the channel ends with sufficient force to loosen and remove at least some of the coating from the walls;

separating the honeycomb carrier from the liquid;

drying the honeycomb carrier in a gas to loosen at least some of the previously wetted coating from the walls, and directing a stream of gas substantially parallel to the walls of the channels into the channels from the channel ends with sufficient force to loosen and remove at least some of the remaining coating from the walls.

2. The method as recited in claim 1 further comprising immersing the honeycomb in an immersion liquid as a first step; and directing the liquid stream into the channels of the immersed honeycomb.

3. The method as recited in claim 1 wherein the liquid comprises water.

4. The method as recited in claim 1 wherein the gas comprises air.

5. The method as recited in claim 1 wherein the coating comprises a catalyst composition.

6. The method as recited in claim 5 further comprising the step of coating the honeycomb with a new catalyst composition.

7. The method as recited in claim 1 wherein there is a plurality of honeycombs assembled to form modules, the module comprises a housing containing the honeycombs, a module inlet side and a module outlet side, honeycomb channels having an inlet and an outlet and the plurality of honeycombs having the honeycomb inlets on the inlet side of the module and the honeycomb outlet on the outlet side of each module.

8. The method as recited in claim 1 wherein the honeycomb comprises from about 8 to about 600 channels per square inch of frontal area.

9. The method as recited in claim 1 wherein the honeycomb is a ceramic honeycomb.

10. The method as recited in claim 9 wherein the liquid stream flows from at least one fluid nozzle and is at a flow rate of 0.5 to 5 gallons per minute per fluid nozzle and at a pressure of from 50 to 150 psi.

11. The method as recited in claim 10 wherein the liquid stream is water at a flow rate of 1.0 to 3 gallons per minute per fluid nozzle at a pressure of from 75 to 125 psi.

12. The method as recited in claim 10 wherein the stream of gas flows from at least one gas nozzle at a pressure of from 50 to 120 psi per gas nozzle.

13. The method as recited in claim 9 wherein the stream of gas flows from at least one gas nozzle at a pressure of from 50 to 150 psi per gas nozzle.

14. The method as recited in claim 13 wherein the stream of gas is at pressure of from 50 to 120 psi per gas nozzle.

15. The method as recited in claim 14 wherein the stream of gas is air at a flow rate of 10 to 100 SCFM and a pressure of from 75 to 110 psi per gas nozzle.

16. The method as recited in claim 1 wherein the honeycomb is a metal plate honeycomb.

17. The method as recited in claim 16 wherein the liquid stream is at a pressure of 500 to 10,000 psi.

18. The method as recited in claim 1 further comprising the step of coating the honeycomb with a new coating.

* * * * *